US009001469B2

(12) United States Patent
Bjorstrom et al.

(10) Patent No.: US 9,001,469 B2
(45) Date of Patent: Apr. 7, 2015

(54) MID-LOADBEAM DUAL STAGE ACTUATED (DSA) DISK DRIVE HEAD SUSPENSION (71) Applicant: Hutchinson Technology Incorporated, Hutchinson, MN (US)

(72) Inventors: Jacob D. Bjorstrom, Hutchinson, MN (US); Mark A. Miller, Darwin, MN (US); Haven A. Mercer, Excelsior, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 13/827,622

(22) Filed: Mar. 14, 2013

(65) Prior Publication Data

US 2013/0242434 A1 Sep. 19, 2013

Related U.S. Application Data (60) Provisional application No. 61/611,962, filed on Mar. 16, 2012.

(51) Int. Cl.
*G11B 5/48* (2006.01)
*G11B 21/16* (2006.01)
*G11B 21/18* (2006.01)

(52) U.S. Cl.
CPC .............. *G11B 21/18* (2013.01); *G11B 5/4873* (2013.01)

(58) Field of Classification Search
CPC .............................. G11B 5/5552; G11B 5/4873
USPC ........... 360/244.2–245.2, 264.3–264.6, 294.3
See application file for complete search history.

(56) References Cited

U.S. PATENT DOCUMENTS

| 3,320,556 | A | 5/1967 | Schneider |
| 4,299,130 | A | 11/1981 | Koneval |
| 4,418,239 | A | 11/1983 | Larson et al. |
| 4,422,906 | A | 12/1983 | Kobayashi |
| 4,659,438 | A | 4/1987 | Kuhn et al. |

(Continued)

FOREIGN PATENT DOCUMENTS

| EP | 0591954 B1 | 4/1994 |
| EP | 0834867 B1 | 5/2007 |

(Continued)

OTHER PUBLICATIONS

U.S. Appl. No. 13/690,883 entitled Microstructure Patterned Surpaces for Integrated Lead Head Suspensions, filed Nov. 30, 2012.

(Continued)

*Primary Examiner* — Adam B Dravininkas
(74) *Attorney, Agent, or Firm* — Faegre Baker Daniels (57) ABSTRACT Various embodiments concern a head suspension system having a load beam. The lead beam comprises a metal base having a proximal portion and a distal portion. Two opposing rails extend along the proximal and distal portions. The load beam has a void in the metal base separating the proximal portion from the distal portion, the void extending between the rails. A pair of microactuators is coupled to each of the proximal portion and the distal portion such that each microactuator extends across the void. The microactuators bend the rails to move the distal portion along a X-Y plane relative to the proximal portion. Additionally, the rails stiffen the load beam to resist movement between the first portion and the second portion along a Z-axis.

24 Claims, 8 Drawing Sheets

(56) References Cited

U.S. PATENT DOCUMENTS

| | | |
|---|---|---|
| 5,140,288 A | 8/1992 | Grunwell |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,526,208 A | 6/1996 | Hatch et al. |
| 5,598,307 A | 1/1997 | Bennin |
| 5,608,590 A | 3/1997 | Ziegler et al. |
| 5,608,591 A | 3/1997 | Klaassen |
| 5,631,786 A | 5/1997 | Erpelding |
| 5,636,089 A | 6/1997 | Jurgenson et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,717,547 A | 2/1998 | Young |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,862,010 A | 1/1999 | Simmons et al. |
| 5,862,015 A | 1/1999 | Evans et al. |
| 5,892,637 A | 4/1999 | Brooks, Jr. et al. |
| 5,898,544 A | 4/1999 | Krinke et al. |
| 5,914,834 A | 6/1999 | Gustafson |
| 5,921,131 A | 7/1999 | Stange |
| 5,924,187 A | 7/1999 | Matz |
| 5,929,390 A | 7/1999 | Naito et al. |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,046,887 A | 4/2000 | Uozumi et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A * | 12/2000 | Murphy et al. ............ 360/294.6 |
| 6,172,853 B1 | 1/2001 | Davis et al. |
| 6,181,520 B1 | 1/2001 | Fukuda |
| 6,195,227 B1 | 2/2001 | Fan et al. |
| 6,215,622 B1 | 4/2001 | Ruiz et al. |
| 6,229,673 B1 | 5/2001 | Shinohara et al. |
| 6,233,124 B1 | 5/2001 | Budde et al. |
| 6,239,953 B1 * | 5/2001 | Mei ............................ 360/294.6 |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,320,730 B1 | 11/2001 | Stefansky et al. |
| 6,330,132 B1 | 12/2001 | Honda |
| 6,349,017 B1 | 2/2002 | Schott |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,490,228 B2 | 12/2002 | Killam |
| 6,493,190 B1 | 12/2002 | Coon |
| 6,493,192 B2 | 12/2002 | Crane et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansaky |
| 6,639,761 B1 | 10/2003 | Boutaghou et al. |
| 6,647,621 B1 | 11/2003 | Roen et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,724,580 B2 | 4/2004 | Irie et al. |
| 6,728,057 B2 | 4/2004 | Putnam |
| 6,728,077 B1 | 4/2004 | Murphy |
| 6,731,472 B2 * | 5/2004 | Okamoto et al. .......... 360/294.3 |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,791,802 B2 | 9/2004 | Watanabe et al. |
| 6,796,018 B1 | 9/2004 | Thornton |
| 6,798,597 B1 | 9/2004 | Aram et al. |
| 6,801,402 B1 | 10/2004 | Subrahmanyam et al. |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |

(56) References Cited

U.S. PATENT DOCUMENTS

| | | |
|---|---|---|
| 7,144,687 B2 | 12/2006 | Fujisaki et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,385,788 B2 | 6/2008 | Kubota et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| RE40,975 E | 11/2009 | Evans et al. |
| 7,625,654 B2 | 12/2009 | Vyas et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,813,083 B2 | 10/2010 | Guo et al. |
| 7,821,742 B1* | 10/2010 | Mei .................... 360/294.3 |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2* | 3/2012 | Iriuchijima et al. ....... 360/294.4 |
| 8,149,542 B2 | 4/2012 | Ando |
| 8,161,626 B2 | 4/2012 | Ikeji |
| 8,169,746 B1 | 5/2012 | Rice et al. |
| 8,174,797 B2 | 5/2012 | Iriuchijima |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,289,652 B2 | 10/2012 | Zambri et al. |
| 8,289,656 B1 | 10/2012 | Huber |
| 8,295,012 B1 | 10/2012 | Tian et al. |
| 8,300,362 B2 | 10/2012 | Virmani et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,446,694 B1* | 5/2013 | Tian et al. .................... 360/245 |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,542,465 B2 | 9/2013 | Liu et al. |
| 8,559,137 B2 | 10/2013 | Imuta |
| 8,665,565 B2 | 3/2014 | Pro et al. |
| 8,675,314 B1 | 3/2014 | Bjorstrom et al. |
| 2001/0012181 A1 | 8/2001 | Inoue et al. |
| 2001/0013993 A1 | 8/2001 | Coon |
| 2001/0030838 A1* | 10/2001 | Takadera et al. ............ 360/245.2 |
| 2001/0043443 A1* | 11/2001 | Okamoto et al. ............. 360/294 |
| 2002/0075606 A1 | 6/2002 | Nishida et al. |
| 2002/0118492 A1* | 8/2002 | Watanabe et al. .......... 360/294.4 |
| 2002/0149888 A1 | 10/2002 | Motonishi et al. |
| 2002/0176209 A1 | 11/2002 | Schulz et al. |
| 2003/0011118 A1 | 1/2003 | Kasajima et al. |
| 2003/0011936 A1 | 1/2003 | Himes et al. |
| 2003/0053258 A1 | 3/2003 | Dunn et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0027727 A1* | 2/2004 | Shimizu et al. ............. 360/294.4 |
| 2004/0027728 A1 | 2/2004 | Coffey et al. |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0274452 A1 | 12/2006 | Arya |
| 2006/0274453 A1 | 12/2006 | Arya |
| 2006/0279880 A1 | 12/2006 | Boutaghou et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0190263 A1 | 7/2009 | Miura et al. |

(56) References Cited

U.S. PATENT DOCUMENTS

| | | | |
|---|---|---|---|
| 2009/0244786 | A1 | 10/2009 | Hatch |
| 2009/0294740 | A1 | 12/2009 | Kurtz et al. |
| 2010/0067151 | A1 | 3/2010 | Okawara et al. |
| 2010/0073825 | A1 | 3/2010 | Okawara |
| 2010/0097726 | A1 | 4/2010 | Greminger et al. |
| 2010/0143743 | A1 | 6/2010 | Yamasaki et al. |
| 2010/0165515 | A1 | 7/2010 | Ando |
| 2010/0165516 | A1 | 7/2010 | Fuchino |
| 2010/0177445 | A1 | 7/2010 | Fuchino |
| 2010/0195252 | A1 | 8/2010 | Kashima |
| 2010/0208390 | A1* | 8/2010 | Hanya et al. ............... 360/245.2 |
| 2010/0220414 | A1 | 9/2010 | Klarqvist et al. |
| 2010/0246071 | A1 | 9/2010 | Nojima et al. |
| 2010/0271735 | A1 | 10/2010 | Schreiber |
| 2010/0290158 | A1 | 11/2010 | Hanya et al. |
| 2011/0013319 | A1 | 1/2011 | Soga et al. |
| 2011/0058282 | A1 | 3/2011 | Fujimoto et al. |
| 2011/0096438 | A1 | 4/2011 | Takada et al. |
| 2011/0096440 | A1 | 4/2011 | Greminger |
| 2011/0123145 | A1 | 5/2011 | Nishio |
| 2011/0141624 | A1 | 6/2011 | Fuchino et al. |
| 2011/0228425 | A1 | 9/2011 | Liu et al. |
| 2011/0242708 | A1 | 10/2011 | Fuchino |
| 2011/0279929 | A1 | 11/2011 | Kin |
| 2011/0299197 | A1 | 12/2011 | Eguchi |
| 2012/0002329 | A1 | 1/2012 | Shum et al. |
| 2012/0087041 | A1 | 4/2012 | Ohsawa |
| 2012/0113547 | A1 | 5/2012 | Sugimoto |
| 2012/0281316 | A1* | 11/2012 | Fujimoto et al. ........... 360/294.4 |
| 2013/0242436 | A1 | 9/2013 | Yonekura et al. |
| 2013/0265674 | A1 | 10/2013 | Fanslau |
| 2014/0022670 | A1 | 1/2014 | Takikawa et al. |
| 2014/0022671 | A1 | 1/2014 | Takikawa et al. |
| 2014/0022674 | A1 | 1/2014 | Takikawa et al. |
| 2014/0022675 | A1 | 1/2014 | Hanya et al. |
| 2014/0063660 | A1 | 3/2014 | Bjorstrom et al. |
| 2014/0078621 | A1 | 3/2014 | Miller et al. |
| 2014/0098440 | A1 | 4/2014 | Miller et al. |

FOREIGN PATENT DOCUMENTS

| | | | |
|---|---|---|---|
| JP | 9198825 | A | 7/1997 |
| JP | 10003632 | A | 1/1998 |
| JP | 2001057039 | A | 2/2001 |
| JP | 2001202731 | A | 7/2001 |
| JP | 2001307442 | A | 11/2001 |
| JP | 2002050140 | A | 2/2002 |
| JP | 2002170607 | A | 6/2002 |
| JP | 2003223771 | A | 8/2003 |
| JP | 2004039056 | A | 2/2004 |
| JP | 2004300489 | A | 10/2004 |
| JP | 2005209336 | A | 8/2005 |
| WO | WO9820485 | A1 | 5/1998 |

OTHER PUBLICATIONS

International Search Report and Written Opinion issued in PCT/US2013/031484, mailed May 30, 2013, 13 pages.

U.S. Appl. No. 13/365,443 entitled Elongated Trace Tethers for Disk Drive Head Suspension Flexures, filed Feb. 3, 2012.

U.S. Appl. No. 14/141,617 entitled Disk Drive Suspension Assembly Having a Partially Flangeless Load Point Dimple, filed Dec. 27, 2013, 53 pages.

U.S. Appl. No. 14/145,515 entitled Balanced Co-Located Gimbal-Based Dual Stage Actuation Disk Drive Suspensions, filed Dec. 31, 2013, 39 pages.

International Search Report and Written Opinion issued in PCT/US2013/059702, dated Mar. 28, 2014, 9 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria , Australia, Dec. 2005.

Harris, N.R. et al., "A Multilayer Thick-film PZT Actuator for MEMs Applications", Sensors and Actuators A: Physical, vol. 132, No. 1, Nov. 8, 2006, pp. 311-316.

International Search Report and Written Opinion issued in PCT/US2013/052885, mailed Feb. 7, 2014, 13 pages.

International Search Report and Written Opinion issued in PCT/US2013/064314, dated Apr. 18, 2014, 10 pages.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Raeymaekers, B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

U.S. Appl. No. 14/216,288 entitled Co-Located Gimbal-Based Dual Stage Actuation Disk Drive Suspension, filed Mar. 17, 2014, 84 pages.

U.S. Appl. No. 61/396,239 entitled Low Resistance Ground Joints for Dual Stage Actuation Disk Drive Suspensions, filed May 24, 2010, 16 pages.

Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.

U.S. Appl. No. 13/955,204, to Bjorstrom, Jacob D. et al., Non-Final Office Action issued on Mar. 24, 2014, 7 pages.

U.S. Appl. No. 13/955,204, to Bjorstrom, Jacob D. et al., Non-Final Office Action issued on Oct. 29, 2013, 9 pages.

U.S. Appl. No. 13/955,204, to Bjorstrom, Jacob D. et al., Notice of Allowance issued on Jan. 7, 2014, 6 pages.

U.S. Appl. No. 13/955,204, to Bjorstrom, Jacob D. et al., Notice of Allowance issued on May 6, 2014, 5 pages.

U.S. Appl. No. 13/955,204, to Bjorstrom, Jacob D. et al., Response filed Apr. 18, 2014 to Non-Final Office Action issued on Mar. 24, 2014, 9 pages.

U.S. Appl. No. 13/955,204, to Bjorstrom, Jacob D. et al., Response filed Nov. 19, 2013 to Non-Final Office Action issued on Oct. 29, 2013, 11 pages.

U.S. Appl. No. 13/972,137, to Bjorstrom, Jacob D. et al., Non-Final Office Action issued Nov. 5, 2013.

U.S. Appl. No. 13/972,137, to Bjorstrom, Jacob D. et al., Notice of Allowance issued on Jan. 17, 2014, 5 pages.

U.S. Appl. No. 13/972,137, to Bjorstrom, Jacob D. et al., Response filed Dec. 2, 2013 to Non-Final Office Action issued Nov. 5, 2013, 12 pages.

U.S. Appl. No. 14/044,238 to Miller, Mark A., Non-Final Office Action issued on Feb. 6, 2014, 9 pages.

U.S. Appl. No. 14/044,238, to Miller, Mark A., Response filed Apr. 22, 2014 to Non-Final Office Action issued on Feb. 6, 2014, 11 pages.

U.S. Appl. No. 14/050,660, to Miller, Mark A. et al., Non-Final Office Action issued on Mar. 31, 2014, 9 pages.

International Search Report and Written Opinion issued in PCT/US13/75320, mailed May 20, 2014, 10 pages.

Pozar, David M. Microwave Engineering, 4th Edition, copyright 2012 by John Wiley & Sons, Inc., pp. 422-426.

* cited by examiner

MID-LOADBEAM DUAL STAGE ACTUATED (DSA) DISK DRIVE HEAD SUSPENSION

CROSS-REFERENCE TO RELATED APPLICATION

This application claims the benefit of U.S. Provisional Application Ser. No. 61/611,962 filed on Mar. 16, 2012 and entitled Mid-Loadbeam Dual Stage Actuated (DSA) Disk Drive Head Suspension, which is incorporated herein by reference for all purposes.

TECHNICAL FIELD

The present invention relates generally to suspensions for disk drives. In particular, the invention is a dual stage actuated (DSA) suspension and associated components.

BACKGROUND OF THE INVENTION

Dual stage actuated (DSA) suspensions, also sometimes known as microactuated or second stage actuated suspensions, are generally known. Such head suspensions typically include a base plate for attaching the head suspension to a disk drive actuator, a mounting region attached to the base plate, a load beam attached or integral to the mounting region, and a flexure supported by the load beam for mounting a magnetic read/write head slider. The one or more microactuators are incorporated to accurately and quickly position the head slider over the desired track on the magnetic disk. Suspensions of these types are disclosed, for example, in the Schirle U.S. Pat. No. 6,621,653, the Kulangara U.S. Pat. No. 7,595,965, the Liu U.S. Patent Application Publication 2011/0228425 and the Okawara U.S. Patent Application Publication 2010/0067151. These references are incorporated herein by reference in their entireties and for all purposes.

The microactuators of head suspensions are typically placed along the loading plate. However, such microactuators must move the distal portion of the base plate and the entire load beam. Relocating the microactuators distally can require the microactuators to move less mass, but distal repositioning of the microactuators may reduce the stroke actuation of the head slider and can cause stability challenges if the actuators are placed along the less stiff load beam. Efforts to miniaturize disk drive head suspensions while at the same time maintaining or increasing performance specifications results in a continuing need for improved DSA-related structures. DSA structures that can provide increased servo bandwidth, increased stroke, increased stability, and/or lower mass would be advantageous.

SUMMARY

Embodiments of the present invention concern a head suspension system. Such a head suspension system can comprise a base plate configured to attach to a disk drive actuation system and a load beam connected to the base plate along a spring region and extending distally from the base plate. Such a load beam can comprise a major planar section having a proximal portion and a distal portion, a first rail extending along a first lateral edge of the major planar section, and a second rail extending along a second lateral edge of the major planar section, the first lateral edge opposite the second lateral edge. A load beam can further include a continuous void in a metal base of the major planar section, the continuous void extending from the first rail to the second rail to separate the proximal portion from the distal portion. A first microactuator can be coupled to each of the proximal portion and the distal portion and extend across the continuous void. Likewise, a second microactuator can be coupled to each of the proximal portion and the distal portion and extend across the continuous void. A head slider having circuitry configured to one or both of read and write data magnetically can be positioned at the distal end of the load beam, mounted on either the distal portion and/or on flexure. The flexure can be electrically connected to each of the first microactuator and the second microactuator. Electrical activation of one or both of the first microactuator and the second microactuator can move the distal portion relative to the proximal portion to actuate the head slider laterally.

The first and the second rails function as the structural linkage between the proximal portion and the distal portion of the load beam. The continuous void and linkage enable the distal portion of the load beam to move in a transverse or tracking direction along an X-Y plane with respect to the proximal portion.

DESCRIPTION OF THE INVENTION

Figure 1:
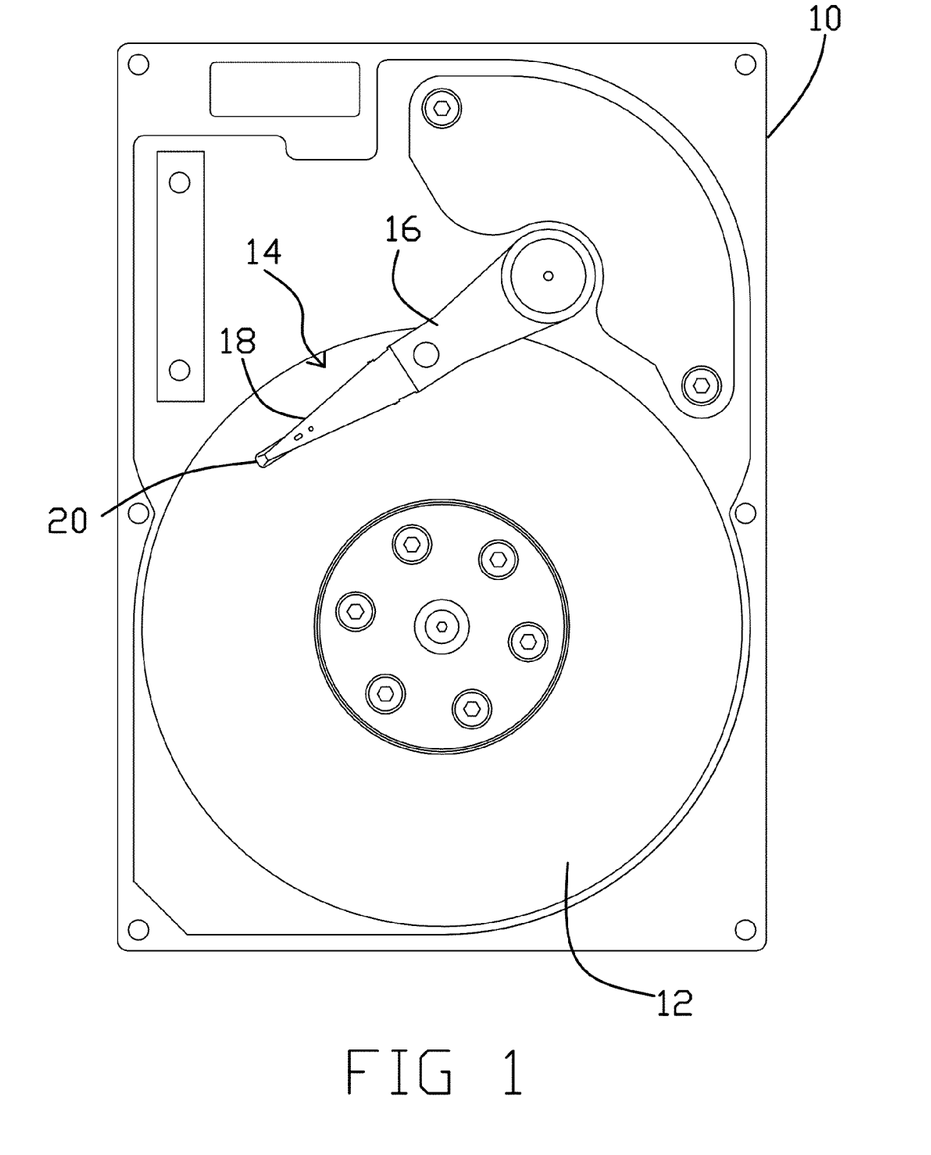
FIG. 1 is an overhead view of a disk drive having a mid-load beam dual stage actuated (DSA) disk drive head suspension.

FIG. 1 is an overhead view of a disk drive 10. The disk drive 10 includes a head suspension 14. The head suspension includes a base plate 16, a load beam 18, and a head slider 20. The head slider 20 includes circuitry for magnetically writing to, and reading from, the disk 12. The head suspension 14 can be scanned over the disk 12 by a head suspension actuation system (not shown) as is known in the art. While movement of the whole head suspension 14 by the head suspension actuation system can provide relatively course position control of the head slider 20, microactuations along the load beam 18 produced by the microactuators, as further described herein, can provide relatively fine positioning adjustment of the head slider 20.

Figure 2:
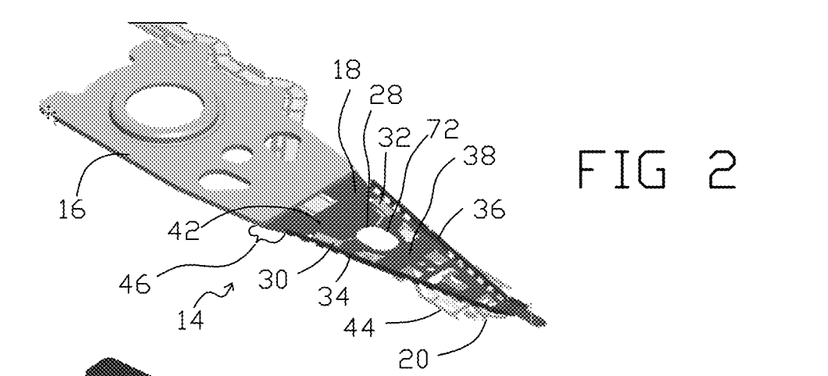
FIG. 2 is an isometric view of a mid-load beam DSA disk drive head suspension.

FIG. 2 is an isometric view of the head suspension 14 of FIG. 1. As shown, the base plate 16 of the head suspension 14 includes a proximal opening for mounting the head suspension 14 on the head suspension actuation system of the disk drive 10. The base plate 16 can be formed from a unitary metal structure that extends as a moveable cantilever. The base plate 16 can be relatively stiff for securely mounting the head suspension 14 to the disk drive actuation system through the proximal hole. For example, the base plate 16 can be rigid such that the base plate 16 does not bend during normal operation of the disk drive 10.

The load beam 18 is an elongated member that extends distally from the base plate 16. As shown herein, the load beam 18 is generally triangularly shaped, although other shapes are possible. The load beam 18 includes a proximal portion 42 and a distal portion 38. The load beam 18 can be attached to the base plate 16 along the spring region 46. The spring region 46 can include a single or multi-piece element. The spring region 46 operates to mechanically couple the load beam 18 to the base plate 16. The spring region 46 may be formed from a single stainless steel plate, and the same stainless steel plate may form the rest of the load beam 18, including the first rail 34 and the second rail 36.

The load beam 18 can be generally planar and can be oriented so as to be generally co-planar to the base plate 16. In other embodiments, the load beam 18 may have other configurations. In other embodiments, the load beam 18 may be oriented out of plane with respect to the base plate 16. Regardless of the nominal orientation, the load beam 18 may slightly rotate about the spring region 46 relative to the base plate 16. Such movement of the load beam 18 can be caused by lift on the load beam 18 generated at the head slider 20 by the flow of air from the moving disk 12 during operation of the disk drive 10. Such rotation of the load beam 18 about the spring region 46 causes the head slider 20 to move up or down (i.e. closer or further away from the disk 12) along the Z-axis. Rotation of the base plate 16 causes the head slider 20 to move left and right (i.e. laterally along the disk 12) over an X-Y plane (orthogonal to the Z-axis).

While bending along the spring region 46 of the load beam 18 may be expected for proper operation of the head suspension 14, bending of the load beam 18 in the Z-axis distally of the spring region 46 is generally unwanted. Therefore, a first rail 34 and a second rail 36 are provided along the proximal portion 42 and distal portion 38 of the load beam 18. The first rail 34 and the second rail 36 can each extend along most or all of the load beam 18 distally of the spring region 46 such that, at least along the Z-axis, the load beam 18 is relatively flexible along spring region 46 and relatively stiff distally of the spring region 46. The first rail 34 and the second rail 36 are positioned on opposite lateral sides of the load beam 18 and extend generally along a longitudinal axis of the load beam 18. The term "longitudinal axis" as used herein refers to an axis of an element that extends along the longest dimension of the element.

A flexure 44 is provided on the head suspension 14. The flexure 44 can be any type of flexible circuit having conductive traces for routing electrical signals between components of the head suspension 14 (e.g., read/write heads of the head slider 20) and other components of the disk drive 10 (e.g., a controller). The flexure 44 can be manufactured as a separate member and welded to the load beam 18 or formed as an integral member of the load beam 18.

The air bearing head slider 20 is located at the distal end of the distal portion 38 of the lead beam 18 and is designed to be resiliently moveable (e.g., gimbaled) with respect to load beam 18 in response to the aerodynamic forces generated as the disk 12 rotates relative to the head slider 20. The head slider 20 contains a magnetic head and is bonded to the flexure 44 by adhesive. The flexure 44 allows the gimbal movement of the head slider 20 to follow variations in the surface of the disk 12. As noted above, air pressure at the surface of the spinning disk 12 creates a positive pressure air bearing that causes the head slider 20 to lift away from and "fly" over the disk 12. In some cases, a negative pressure air bearing pulls the head slider 20 toward the disk 12. To counteract these hydrodynamic forces, the head suspension 14 is mounted to the disk drive 10 with the suspension in a loaded state so the spring region 46 biases the head slider 20 either toward or away from the disk 12 to an appropriate fly height.

A first microactuator 30 and a second microactuator 32 are mounted on the load beam 18. Each of the first microactuator 30 and the second microactuator 32 comprise a generally planar element with a length (e.g., along a longitudinal axis) and a width. The first microactuator 30 and the second microactuator 32 can be any suitable type of microactuator, whether now known or later developed. For example, the first microactuator 30 and the second microactuator 32 can each be a piezoelectric microactuator, which may include a piezoelectric layer of lead zirconium titanate, polymers such as polyvinylidene fluoride (PVDF), or other piezoelectric or electrostrictive types of materials. As will be appreciated, each microactuator includes terminals (not shown) for electrically coupling the microactuator to a power supply and to ground. The first microactuator 30 and the second microactuator 32 may include multiple piezoelectric layers and/or may include different piezoelectric materials as are known in the art. Selective activation of the first microactuator 30 and a second microactuator 32 for controlling movement of the distal portion 38 of the load beam 18 is further discussed herein.

Figure 4:
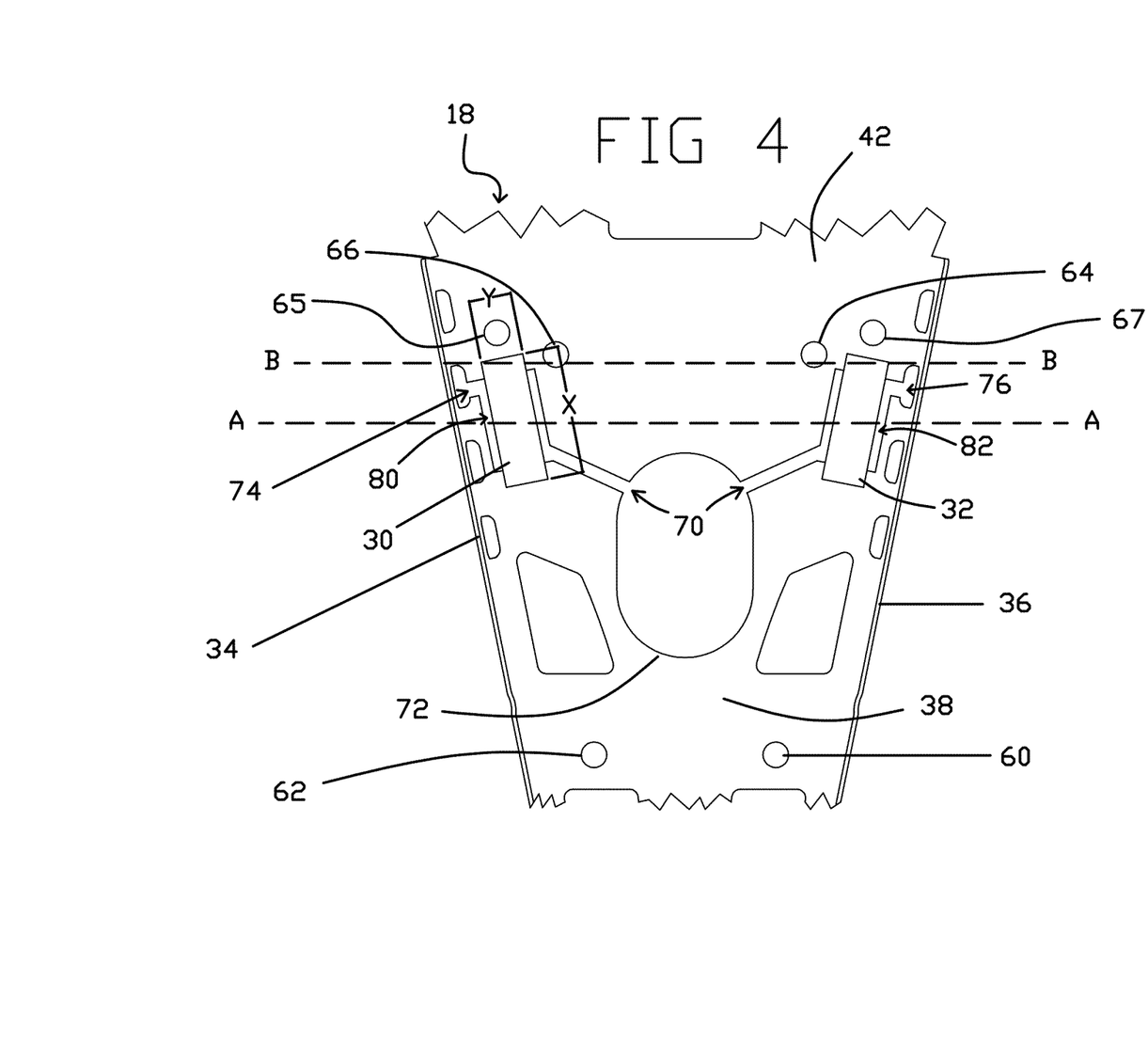
FIG. 4 is a detailed plan view of the DSA structure portion of the load beam of the suspension shown in FIG. 2, showing the side of the load beam with the rails extending out of the page.

FIG. 4 shows a closer overhead view of a portion of the load beam 18 of FIG. 2. The load beam 18 is formed from a base structure. The base structure is typically a stainless steel sheet. In some cases, the base structure can be a unitary metal sheet forming each of the first rail 34, the second rail 36, and a major planar section 28 (shown in FIG. 5B). As shown in FIG. 4, the load beam 18 is bisected by continuous void in the major planar section 28 of the load beam 18, the void extending continuously from the first rail 34 on one lateral extreme of the load beam 18 to a second rail 36 on the opposite lateral extreme of the load beam 18. The void extends fully through the base structure of the load beam 18 such that the void is open on top and bottom sides of the load beam 18. In this way, a continuous void in the base structure of the load beam 18 divides the load beam 18 into the proximal portion 42 and the distal portion 38. Being that the load beam 18 can be formed from a unitary metal element (e.g., a single sheet of stainless steel), the only part of the unitary metal element that extends between the proximal portion 42 and the distal portion 38 may be the first rail 34 and the second rail 36, as the cutout eliminates any direct connection of the base structure between the proximal portion 42 and the distal portion 38 along the major planar section 28 of the load beam 18. As such, the first rail 34 and the second rail 36 can function as the main or only structural linkages between the proximal portion 42 and the distal portion 38 of the load beam 18 which has particular advantages as discussed herein.

The void, in spanning from the first rail 34 to the second rail 36, can be formed by multiple sections. The void can be formed, in part, by a tooling hole 72. The tooling hole 72 can be rounded to avoid stress points in the load beam 18 during bending. It is noted that not all embodiments may include a tooling hole 72. The void includes crossbeam cutout 70 that connects a void of a first pocket 80 with a void of a second pocket 82. The first microactuator 30 can be placed over and/or within the first pocket 80 while the second microactuator 32 can be placed over and/or within the second pocket 82, as further discussed herein. As shown, the first microactuator 30 can span across the first pocket 80 to be attached to each of the proximal portion 42 and the distal portion 38. Likewise, the second microactuator 32 can span across the second pocket 82 and be attached to each of the proximal portion 42 and the distal portion 38. Each microactuator can be attached to the proximal portion 42 and the distal portion 38 by adhesive or other connection technique. The void spanning across the load beam 18 includes the first lateral cutout 74 that extends the void of the first pocket 80 to underneath the first rail 34. Likewise, the second lateral cutout 76 extends the void of the second pocket 82 to underneath the second rail 36. It noted that the void, in some alternative embodiments, may not extend fully between the first rail 34 and the second rail 36. For example, the first lateral cutout 74 and/or the second lateral cutout 76 may not be present. Additionally or alternatively, one or more bridges of base structure may extend between the proximal portion 42 and the distal portion 38.

Figure 5A:
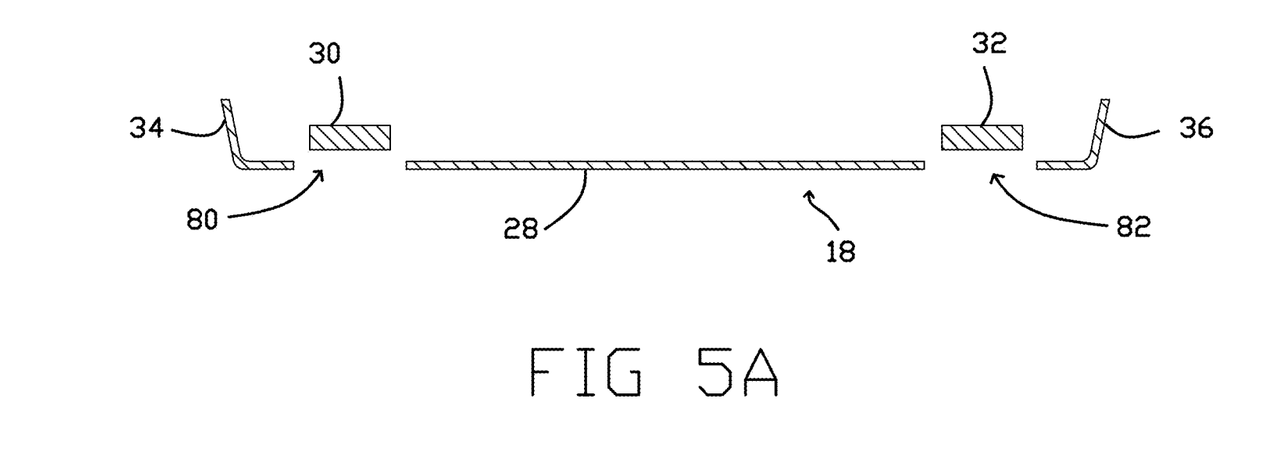
FIG. 5A is a cross section view along line A-A of FIG. 4.
Figure 5B:
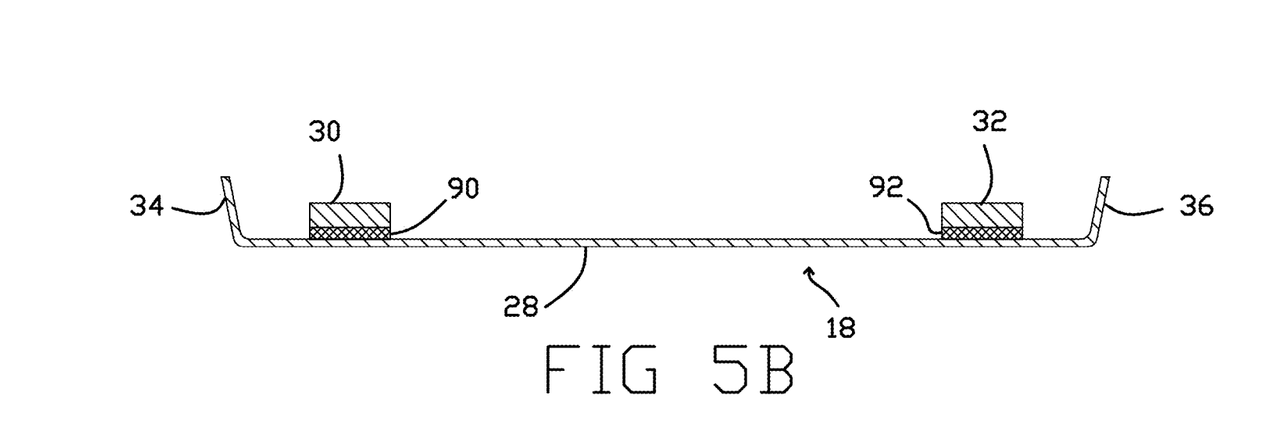
FIG. 5B is a cross section view along line B-B of FIG. 4.

FIG. 5A is a cross sectional view along line A-A of FIG. 4. FIG. 5B is a cross sectional view along line B-B of FIG. 4. FIGS. 5A-B show that each of the first rail 34 and the second rail 36 are oriented substantially orthogonal to the major planar section 28 of the load beam 18. FIG. 5B also shows that each of the first microactuator 30 and the second microactuator 32 are mechanically connected to the load beam 18 by a first coupler 90 and a second coupler 92, respectively. The first coupler 90 and the second coupler 92 may comprise a layer of adhesive. The adhesive may be deposited on each of the proximal portion 42 and the distal portion 38 to mechanically connect each of the first microactuator 30 and the second microactuator 32 to the proximal portion 42 and the distal portion 38.

As shown in FIG. 4, a longitudinal axis of the first microactuator 30 can extend parallel with a longitudinal axis of the first rail 34 while a longitudinal axis of the second microactuator 32 can extend parallel with a longitudinal axis of the second rail 36, while the longitudinal axis of the first microactuator 30 is not parallel with the longitudinal axis of the second rail 36 and the longitudinal axis of the second microactuator 32 is not parallel with the longitudinal axis of the first rail 34.

In operation, an applied electrical voltage across the first microactuator 30 and/or second microactuator 32 causes them to expand or contract, thereby causing deformation load beam 18. This deflection provides high resolution positioning of the head slider 20. By having one of the first microactuator 30 or second microactuator 32 expand and the other contract, or visa versa, lateral motion of the head slider 20 can be generated along an X-Y plane that runs parallel to the disk 12, as further discussed herein. Various electronic control circuits for controlling the piezoelectric actuators to perform the functions discussed herein are disclosed in U.S. Pat. No. 5,377,058 (Good et al.); U.S. Pat. No. 5,719,720 (Lee); and U.S. Pat. No. 5,802,701 (Fontana et al.), each of which is incorporated herein by reference in its entirety.

It is noted that flat elements, such as the major planar section 28, the first rail 34, and the second rail 36, in isolation, generally bend relatively easily in the two opposing directions that are orthogonal to the major plane of the flat element but resist bending along an axis that is parallel with the major plane. Being that the first rail 34 and the second rail 36 are both orthogonal to the major planar section 28 of the load beam 18, the first rail 34 and the second rail 36 resist bending of the load beam 18 in a direction orthogonal to the major planar section 28 (e.g., along the Z-axis), stiffening the load beam 18 to movement in the Z-axis. As such, bending of the head suspension 14 that would move the head slider 20 closer or further away from the disk 12 along the Z-axis is generally isolated to the spring region 46, where the first rail 34 and the second rail 36 do not extend. Moreover, the major planar section 28 would generally resist bending of the load beam 18 in a direction orthogonal to the first rail 34 and the second rail 36 (i.e. lateral swaying of the load beam 18). However, the continuous void in the major planar section 28 allows the distal portion 42 to move along an X-Y plane relative to the proximal portion 42 and thereby facilitate lateral translation of the head slider 20 over the disk 12. Selective activation of the first microactuator 30 and the second microactuator 32 can drive such lateral bending of the load beam 18. Specifically, the continuous void in the base structure can allow movement of the distal portion 38 relative to the proximal portion 42, widening or narrowing at least a portion of the void during movement of the distal portion 38 relative to the proximal portion 42. As such, the load beam 18 can be laterally actuated through bending in each of the first rail 34 and the second rail 36, the bending driven by the first microactuator 30 and the second microactuator 32 being oppositely expanded and contracted.

Suspensions having DSA structures in accordance with the present disclosure can provide several advantages. Total strokes of 100 nm or more can be achieved (e.g., at 5-6 nm/V), although the invention can be used in suspensions configured for less stroke. For example, in a tested embodiment, the presence of the crossbeam cutout 70 to the tooling hole 72 increased stroke by 43% while the first lateral cutout 74 and the second lateral cutout 76 increased stroke by 39%. Moreover, the location of the continuous void as being between the proximal flexure welds 64 and 66 on the distal flexure welds 60 and 62 also increased stroke and minimized shock impact. The DSA structure can be efficiently manufactured using conventional or otherwise known processes and equipment. Servo bandwidths can be significantly enhanced. Enhanced stroke and tracking specifications can be achieved. These advantages can be achieved with little or no degradation of shock and resonance performance.

It is noted that performance of some embodiments of the invention can be optimized by using microactuators with relatively narrow widths ("Y" in FIG. 4) and/or small thicknesses as compared to the length ("X" in FIG. 4) of the microactuator. Minimizing the "Y" width of the microactuators to 0.0762 mm (3 mils) increased stroke by 21% in tests. In any of the embodiments referenced herein, a microactuator can have a width of 0.25 mm or less, and a thickness of 0.0762 mm or less. However, other embodiments of the invention may have microactuators with other (e.g., greater) widths and/or thicknesses (e.g., about 0.102 mm). The length of each microactuator can be selected and optimized with other parameters of the DSA structure to achieve the desired stroke length. In one embodiment for example, the microactuators can be about 0.75 mm in length. The first microactuator 30 is adjacent to the first rail 34 while the second microactuator 32 is adjacent to the second rail 36. As shown in FIG. 4, the longitudinal axis of the first microactuator 30 extends parallel with the first rail 34. The longitudinal axis of the first microactuator 30 is not parallel with neither the longitudinal axis of the second microactuator 36 nor the second rail 36. The longitudinal axis of the second microactuator 36 extends parallel with the second rail 36. The longitudinal axis of the second microactuator 36 is not parallel with neither the longitudinal axis of the first microactuator 30 nor the first rail 34. In an alternative embodiment, the first microactuator 30 is not parallel with neither the second microactuator 36

As discussed herein, the flexure 44 can extend over the head suspension 14, including the load beam 18, to route electrical signals between control circuitry and read/write elements of the head slider 20. The flexure 44 can be supported by flexure welds 60, 62, 64, and 66 on the load beam 18. For example, each of flexure welds 60, 62, 64, and 66 can provide a location for welding the flexure 44 to the load beam 18 to mechanically support the flexure 44 and/or provide a ground electrical connection to the load beam 18.

To manufacture and assemble the head suspension 14, the base plate 16 and the load beam 18 can be formed using any suitable technique, e.g., etching and bending a metal base structure such as a stainless steel sheet. The load beam 18 can be formed by etching a plurality of cutouts in a metal sheet, the plurality of cutouts corresponding to the voids, holes, and other features in the metal base shown herein. The etching can create the continuous void in the metal sheet. Forming the load beam 18 can further comprise bending the metal sheet to form the first rail 34 and the second rail 36. Typically, the metal sheet is etched before bending or other features are formed, however, etching can occur after one or more bending steps have been performed. After forming the base structure of the lead beam 19, the flexure 44 can be welded to the load beam 18. The first microactuator 30 and the second microactuator 32 can be positioned over or in the first pocket 80 and attached to the proximal portion 42 and the distal portion 38 using, for example, an adhesive or other technique providing a mechanical bond. The second microactuator 32 can be mounted similarly over or within the second pocket 82.

Figure 3:
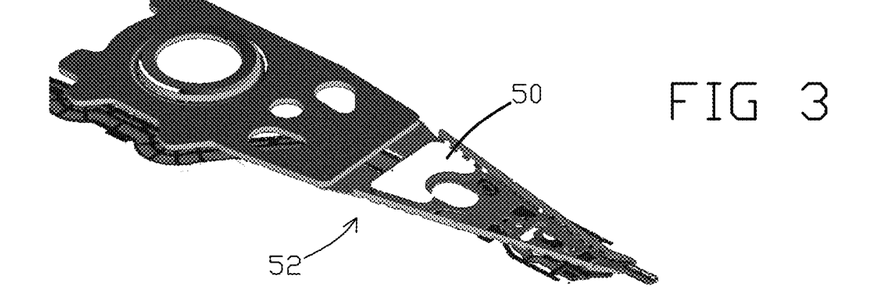
FIG. 3 is an isometric view of another embodiment that has a viscoelastic or other damper over the DSA structure, but is otherwise substantially the same as or similar to the suspension shown in FIG. 2.

The head suspension 52 of FIG. 3 can be similar in construction and function to the head suspension 14 of FIG. 2 (or as otherwise referenced herein), except that the head suspension 52 includes a damper 50. The damper 50 can be formed from viscoelastic or other suitable material to dampen vibration between the proximal portion and the distal portion of a load beam of the head suspension 14. The damper 52 can be mounted over or underneath the microactuators (not illustrated) and optionally further can be connected to each of the proximal portion and the distal portion of the load beam of a head suspension to damped movement across the continuous void between the proximal portion and the distal portion. The damper 52 can suppress resonance vibration that can result when the head slider 20 floats over the disk 12 while the disk 12 rotates at high speed.

Figure 6A:
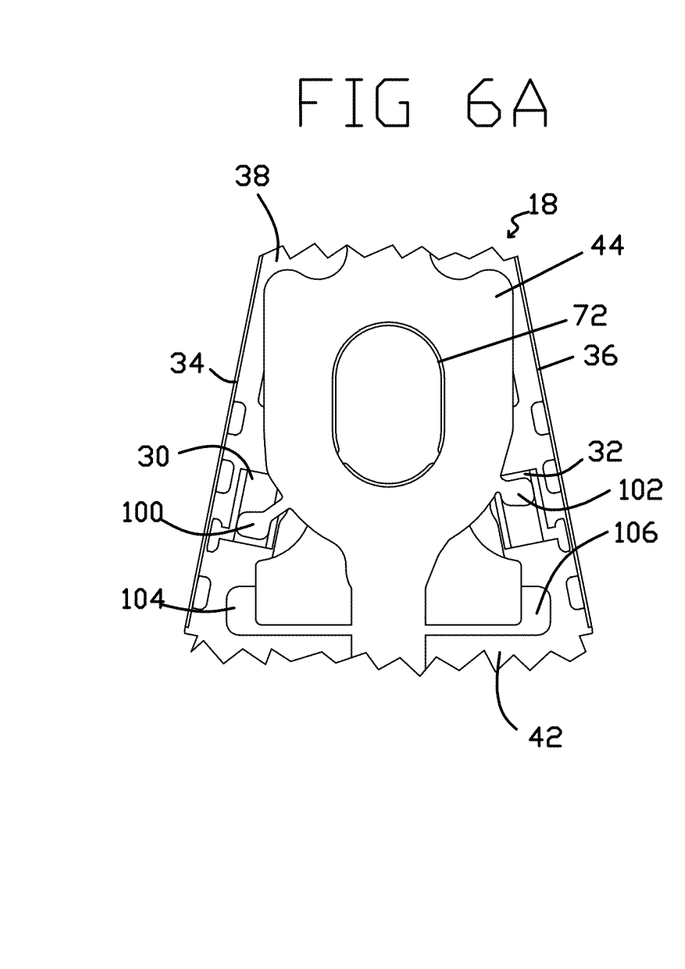
FIG. 6A is a detailed plan view of the DSA structure portion of the suspension shown in FIG. 2, showing the flexure side with the rails extending into the page.
Figure 6B:
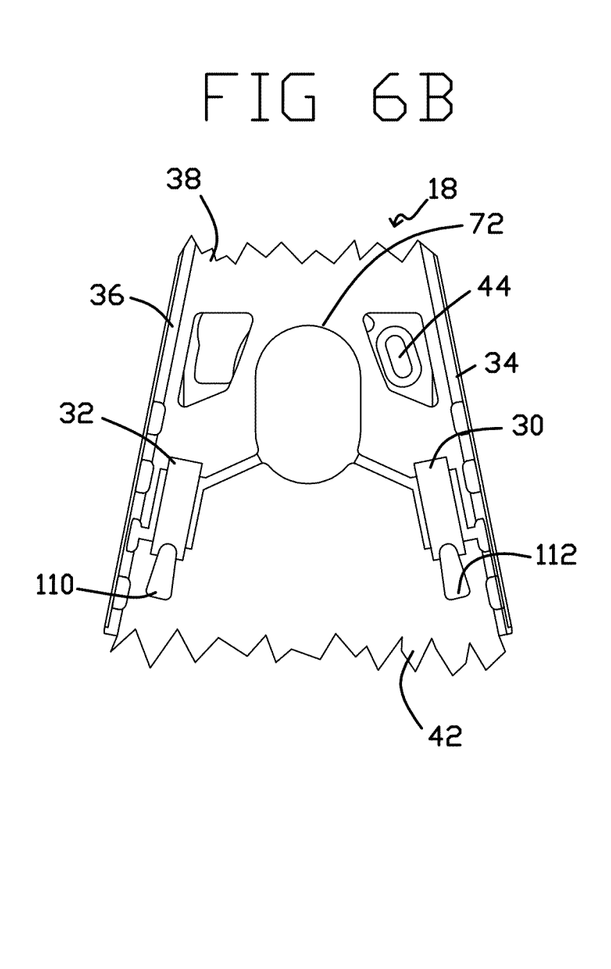
FIG. 6B is a detailed plan view of the opposite side of the load beam and DSA structure portion shown in FIG. 6A.

FIG. 6A shows a bottom view of a portion of the load beam 18 while FIG. 6B shows a top view of the portion of the load beam 18. In particular, FIGS. 6A-B show how the flexure 44 can electrically connect with each of the first microactuator 30 and the second microactuator 32. As shown in FIG. 6A, the flexure 44 can extend along the bottom side of the load beam 18. A first lead 100 can branch from the flexure 44 to contact the first microactuator 30, where an electrical connection can be made to power the first microactuator 30 through the first lead 100. For example, a conductive trace of the first lead 100 can be soldered or adhered with conductive adhesive to a terminal of the first microactuator 30. A second lead 104 can also branch from the flexure 44 to extend over the first through-hole 65 in the load beam 18, the first through-hole 65 connecting with the top side of the load beam 18. The second lead 104 can include a conductive trace that electrically connects with a conductor that extends through the first through-hole 65 to the top side of the load beam 18. A first bridge 112 can be connected to the proximal portion 42. The first bridge 112 can be formed from an electrically conductive material (e.g., an electrically conductive adhesive) or can contain an electrical conductor. The first bridge 112 can extend to the first microactuator 30 to make an electrical connection with a terminal of the first microactuator 30 (e.g., by electrically conductive adhesive). In the particular embodiment illustrated, a mass of electrically conductive adhesive can fill the first through-hole 65 to electrically connect with the first lead 100 and can further extend to make a mechanical and electrical connection with the first microactuator 30. Gold can be plated onto the load beam 18 at locations where the electrically conductive adhesive is attached to enhance the electrical ground connection. The first lead 100 and the second lead 104 can facilitate electrical connections to respective anode and cathode terminals of the first microactuator 30 to power the first microactuator 30. Other arrangements for electrically powering the first microactuator 30 from the flexure 44 or other source are alternatively possible.

A third lead 102 can branch from the flexure 44 to contact the second microactuator 32, where an electrical connection can be made to power the second microactuator 32 through the third lead 102. For example, a conductive trace of the third lead 102 can be soldered or adhered with conductive adhesive to a terminal of the second microactuator 32. A fourth lead 106 can also branch from the flexure 44 to extend over the second through-hole 67 in the load beam 18, the second through-hole 67 connecting with the top side of the load beam 18. The fourth lead 106 can include a conductive trace that electrically connects with a conductor that extends through the second through-hole 67 to the top side of the load beam 18. A second bridge 110 can be connected to the proximal portion 42. The second bridge 110 can be formed from an electrically conductive material (e.g., an electrically conductive adhesive, solder) or can contain an electrical conductor. The second bridge 110 can extend to the second microactuator 32 to make an electrical connection with a terminal of the second microactuator 32 (e.g., by electrically conductive adhesive, solder). In the particular embodiment illustrated, a mass of electrically conductive adhesive can fill the second through-hole 67 to electrically connect with the third lead 102 and can further extend to make a mechanical and electrical connection with the second microactuator 32. As such, the third lead 102 and the fourth lead 106 can facilitate electrical connections to respective anode and cathode terminals of the second microactuator 32 to power the second microactuator 32. Other arrangements for electrically powering the second microactuator 32 from the flexure 44 or other source are alternatively possible.

Figure 7:
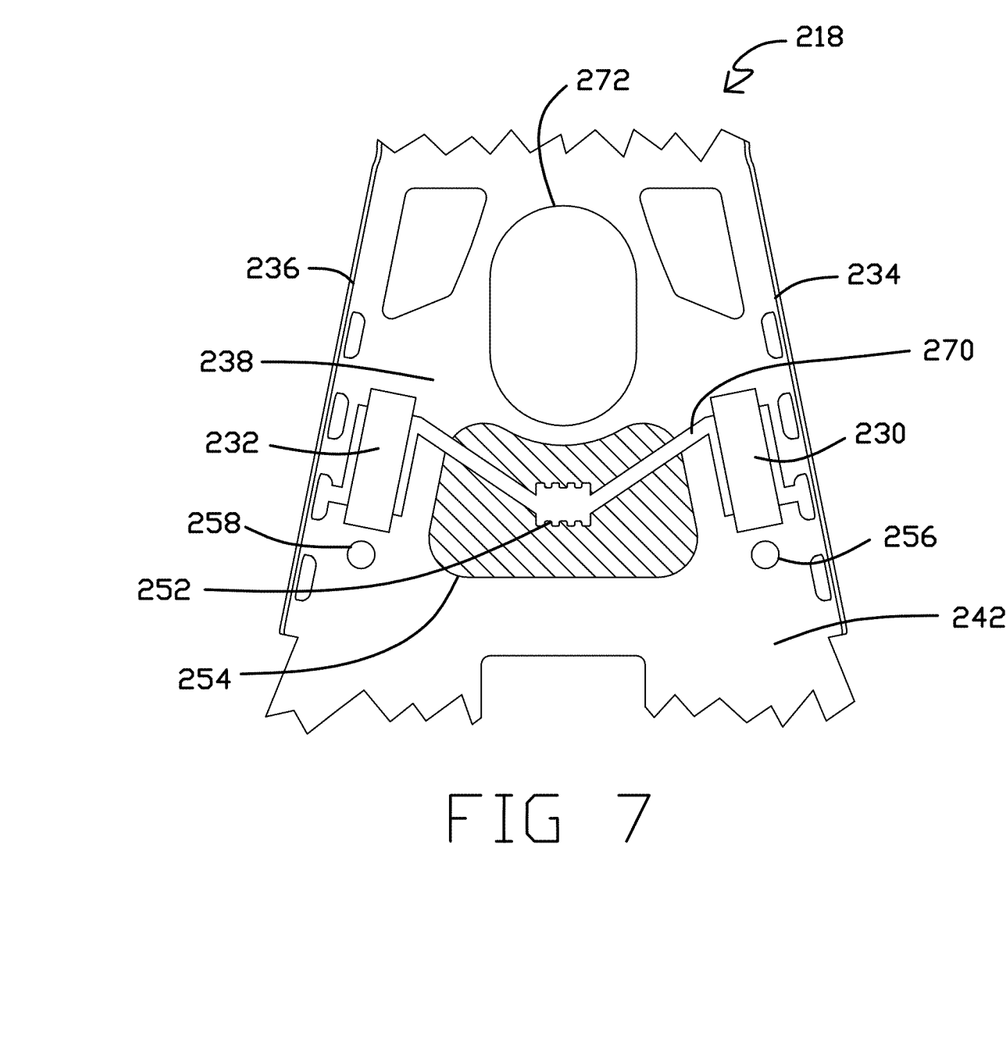
FIG. 7 is a detailed plan view of a DSA structure portion of a load beam showing the side of the load beam with the rails extending out of the page.

While FIGS. 2-6B illustrate embodiments where the continuous void traverses from the first rail 34 to the second rail 36 by branching to the tooling hole 72, a continuous void may not include the tooling hole 72 in some other embodiments. FIG. 7 illustrates a portion of a load beam 218 that can be similar to any embodiment referenced herein except that the crossbeam cutout 270 of the continuous void that extends from the first rail 234 to the second rail 236 does not include the tooling hole 272.

The load beam 218 is shown to include stiffener members 254. The load beam 218 can be manufactured initially with stiffener members 254 on a base structure (e.g., stainless steel) of the load beam 218. The stiffener members 254 can extend from the proximal portion 242 to the distal portion 238 of the load beam 218. The stiffener members 254 can stiffen the structure of the load beam 218, which is generally relatively thin. The stiffener members 254 can thereby enhance the ability of the load beam 218 to be handled during manufacturing steps such as forming of the first rail 234, the second rail 236, or a radius region and/or in processes for attaching the first microactuator 230 and the second microactuator 232. The crossbeam cutout 270 can include a de-tabbed void 252, which is shown to include stubs. The de-tabbed void 252 can allow the crossbeam cutout 270 to change orientations such that the crossbeam cutout 270 is symmetrical between left and right sides while not extending straight across the load beam 218. It is noted that a tooling hole, as presented in other embodiments, can provide the same function. In some embodiments, the stiffener members 254 can be removed after one, multiple, or all of the above referenced assembly steps are complete.

Figure 8A:
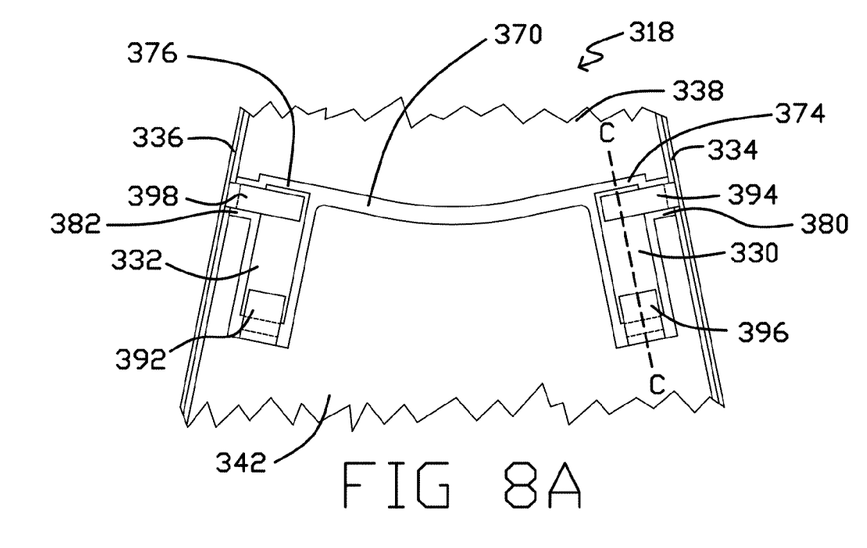
FIG. 8A is a detailed plan view of a DSA structure portion of a load beam with the microactuators mounted to tabs on the load beam.
Figure 8B:
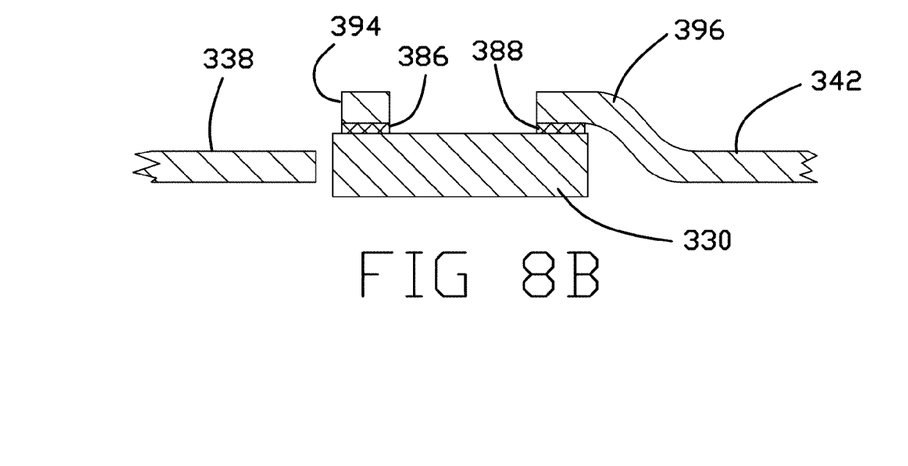
FIG. 8B is a cross section view along line C-C of FIG. 8A.

FIG. 8A illustrates a portion of a load beam 318. FIG. 8B shows a cross sectional view of the load beam 318 along line C-C. Unless otherwise shown or discussed, the load beam 318 can be similar to any load beam configuration referenced herein. The load beam 318 includes a proximal portion 342, a distal portion 338, a first microactuator 330, a second microactuator 332, a first rail 334, and a second rail 336. A continuous void extending from the first rail 334 to the second rail 336 is formed in the load beam 318 by a first lateral cutout 374 extending from the first rail 334 to a first pocket 380, a crossbeam cutout 370 extending between the first pocket 380 and a second pocket 382, and second lateral cutout 376 extending from the second pocket 382 to the second rail 336. The continuous void extending from the first rail 334 to the second rail 336 can allow lateral bending and vertical stiffness between the proximal portion 342 and the distal portion 338 as described herein.

The load beam 318 can include tabs for supporting the first microactuator 330 and the second microactuator 332. Specifically, the load beam 318 includes a first proximal tab 396 and a first distal tab 394. The first proximal tab 396 and/or the first distal tab 394 can be formed from the same base structure as the first rail 334 and the major planar section of the load beam 318. For example, the first proximal tab 396 and/or the first distal tab 394 can be left in place as a metal sheet is etched and bent to form the base structure of the load beam 318. Alternatively, the first proximal tab 396 and/or the first distal tab 394 can separately attached to the base structure of the load beam 318.

The first proximal tab 396 can be continuous with the base structure of the major planar section of the load beam 318 such that the first proximal tab 396 is formed from the same unitary body as the base structure of the major planar section of the load beam 318. Alternatively, the first proximal tab 396 can be formed separately and attached to the base structure of the major planar section of the load beam 318. For example, the first proximal tab 396 can be formed separately and adhered to a proximal edge of the first pocket 380. The first proximal tab 396 can be bent or attached to the load beam 318 so as to extend over or underneath the first pocket 380 and therefore not extend within the first pocket 380. The first distal tab 394 can extend from the first rail 334 over or below the first pocket 380. As shown, the first distal tab 394 can extend from the top of the first rail 334 as a cantilever. The first distal tab 394 can be continuous with the first rail 334 such that the first distal tab 394 is formed from the same unitary body as the first rail 334. Alternatively, the first distal tab 394 can be formed separately and attached to the first rail 334. Adhesive layers 386 and 388 can be provided to couple the first microactuator 330 to the first distal tab 394 and the first proximal tab 396, respectively. The first distal tab 394 and the first proximal tab 396 can be aligned over or underneath the first pocket 380 such that the first actuator 330 can be placed within the first pocket 380 such that one side of the first actuator 330 contacts both of the first distal tab 394 and the first proximal tab 396 while the first microactuator 330 remains coplanar or parallel with the major planar surface of the load beam 318. Such alignment can isolate the expansion of the first actuator 330 to increase or decrease the separation between the proximal portion 342 and the distal portion 338 while minimizing torsion between the proximal portion 342 and the distal portion 338. Also, displacement of the first distal tab 394 and the first proximal tab 396 above or below the first pocket 380 allows the first actuator 330 to be directly placed into the first pocket 380 and onto the first distal tab 394 and the first proximal tab 396 from the bottom or top of the load beam 318. The second microactuator 332 can be mounted within the second pocket 382 and supported by the second proximal tab 392 and the second distal tap 398 in the same manner as described herein for the first microactuator 330, the first distal tab 394, and the first proximal tab 396 to have a mirrored structure and function.

Figure 9A:
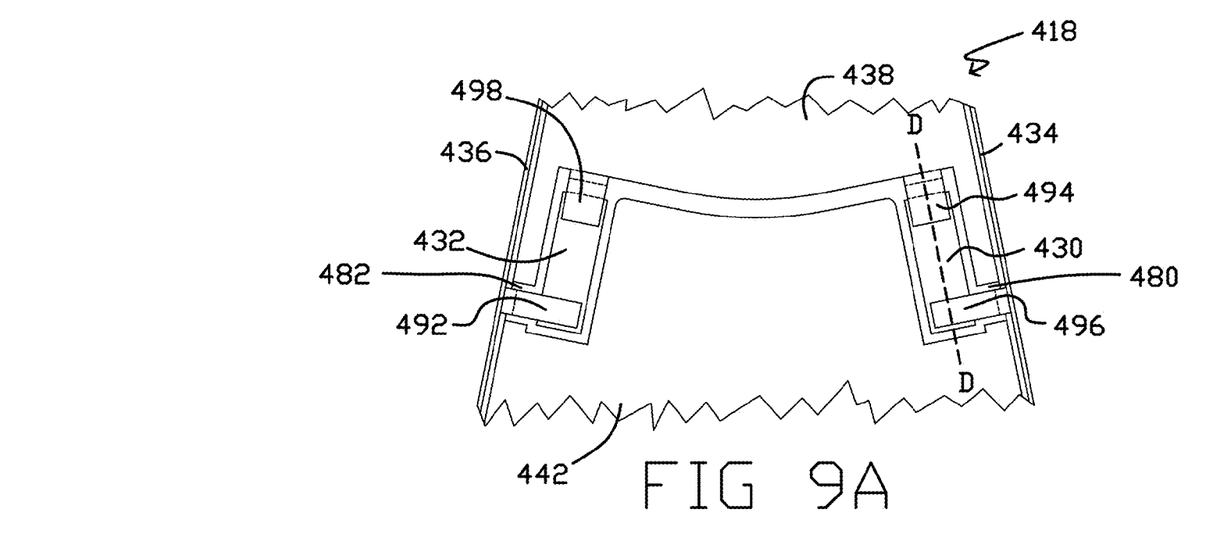
FIG. 9A is a detailed plan view of a DSA structure portion of the load beam with the microactuators mounted to tabs on the load beam.
Figure 9B:
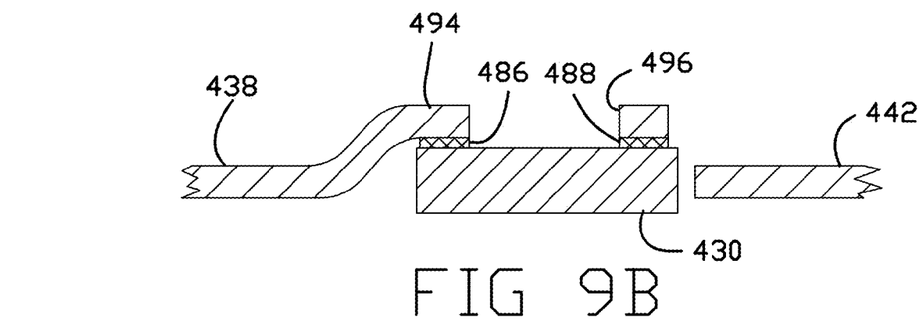
FIG. 9B is a cross section view along line D-D of FIG. 9A.

FIG. 9A illustrates a portion of a load beam 418. FIG. 9B shows a cross sectional view of the load beam 418 along line D-D. The load beam 418 can be structurally and functionally similar to the load beam 318 of FIGS. 8A-B except that the first proximal tab 496 extends from the first rail 434 while the first distal tab 494 extends from distal edge of the first pocket 480. The first proximal tab 496 can be attached to the first rail 434 in the same manner as the first distal tab 394 is attached to the first rail 334. Likewise, the first distal tab 494 can be attached to the base structure of the major planar section of the load beam 418 in the same manner as the first proximal tab 396 is attached to the base structure of the major planar section of the load beam 318. The second microactuator 432 can be mounted within the second pocket 482 and supported by the second proximal tab 492 and the second distal tap 498 in the same manner as described herein for the first microactuator 430, the first distal tab 494, and the first proximal tab 496 (or as otherwise described herein) to have a mirrored structure and function. In still other embodiments of the invention (not shown), a flexure can be configured with tabs that extend into the pocket of the continuous, and the microactuators can be mounted to the tabs of the flexure.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The following is claimed:

1. A head suspension system comprising:
   a base plate configured to attach to a disk drive actuation system;
   a load beam connected to the base plate along a spring region, the load beam extending distally from the base plate, the load beam comprising:
   a major planar section having a proximal portion and a distal portion;
   a first rail extending along a first lateral edge of the major planar section, the first rail oriented substantially orthogonal to the major planar section of the load beam, the first rail extending straight from the proximal portion to the distal portion;
   a second rail extending along a second lateral edge of the major planar section, the first lateral edge opposite the second lateral edge, the second rail oriented substantially orthogonal to the major planar section of the load beam, the second rail extending straight from the proximal portion to the distal portion; and a continuous void in a metal base of the major planar section, the continuous void extending from the first rail to the second rail to separate the proximal portion from the distal portion;

a first microactuator coupled to each of the proximal portion and the distal portion and extending across the continuous void;

a second microactuator coupled to each of the proximal portion and the distal portion and extending across the continuous void; and a flexure electrically connected to each of the first microactuator and the second microactuator, wherein electrical activation of one or both of the first microactuator and the second microactuator moves the distal portion relative to the proximal portion.

2. The head suspension of claim 1, wherein the first rail and the second rail stiffen the load beam to resist bending between the proximal portion and the distal portion along a Z-axis, and wherein the first rail and the second rail bend to allow relative movement between the proximal portion and the distal portion along a X-Y plane to widen or narrow at least a portion of the continuous void.

3. The head suspension of claim 1, wherein each of the first rail and the second rail are orientated orthogonal to the major planar section.

4. The head suspension of claim 1, wherein the continuous void extends underneath each of the first rail and the second rail.

5. The head suspension of claim 1, wherein the first rail and the second rail each extend the full length of the proximal section and the distal section of the major planar section and do not extend along the spring region.

6. The head suspension of claim 1, wherein the first microactuator and the second microactuator are electrically powered through a plurality of leads that branch from the flexure to respectively electrically connect with the first microactuator and the second microactuator.

7. The head suspension of claim 1, wherein the continuous void includes a tooling hole.

8. The head suspension of claim 1, wherein the continuous void includes cutouts in each of the first rail and the second rail.

9. The head suspension of claim 1, wherein the continuous void includes a first pocket and a second pocket, and wherein the first microactuator extends one or both of over and within the first pocket and the second microactuator extends one or both of over and within the second pocket.

10. The head suspension of claim 9, wherein:
the first microactuator is mounted on a first tab that extends over the first pocket and on a second tab that extends over the first pocket, the first tab connected to the major planar section and the second tab connected to the first rail; and
the second microactuator is mounted on a third tab that extends over the second pocket and on a fourth tab that extends over the second pocket, the third tab connected to the major planar section and the fourth tab connected to the second rail.

11. The head suspension of claim 1, wherein the first microactuator and the second microactuator are each positioned within the continuous void and are co-planar with the major planar section.

12. The head suspension of claim 1, wherein the major planar section, the first rail, and the second rail are each formed from a metal sheet.

13. The head suspension of claim 12, wherein the metal sheet is bent to define the first rail and the second rail relative to the major planar section.

14. The head suspension of claim 12, wherein the metal sheet is etched to create the continuous void.

15. The head suspension of claim 1, wherein a stiffening structure is located on the major planar section and extends between the proximal section and the distal section during manufacturing of the lead suspension.

16. The head suspension of claim 1, wherein a dampening structure is located on the major planar section over the first microactuator and the second microactuator, the dampening structure dampening vibration between the proximal section and the distal section.

17. The head suspension of claim 1, wherein the longitudinal axis of the first microactuator is parallel with the first rail, the longitudinal axis of the second microactuator is parallel with the second rail, and the first rail is not parallel with the second rail.

18. The head suspension of claim 1, wherein each of the first microactuator and the second microactuator have a width of about 0.25 millimeters or less and the thickness of about 0.0762 millimeters or less.

19. The head suspension of claim 1, wherein the load beam comprises a first side and a second side, the first side opposite the second side, and each of the first microactuator and the second microactuator are mounted on the first side while the flexure extends along the second side.

20. The head suspension of claim 19, wherein the load beam further comprises a first through-hole extending from the first side to the second side and a second through-hole extending from the first side to the second side, a first electrical connection is made between the flexure and the first microactuator through the first through-hole, and a second electrical connection is made between the flexure and the second microactuator through the second through-hole.

21. A head suspension system comprising:
a load beam comprising a metal base, the metal base having a spring region and a major planar section, the major planar section comprising a proximal portion that is distal of the spring region and a distal portion that is distal of the proximal portion, the load beam further comprising a first rail extending along each of the proximal portion and the distal portion, a second rail extending along each of the proximal portion and the distal portion, and a void in the metal base separating the proximal portion from the distal portion, the void extending from the first rail to the second rail, wherein each of the first rail and the second rail are oriented substantially orthogonal to the major planar section, the first rail being flat from the proximal portion to the distal portion, and the second rail being flat from the proximal portion to the distal portion;
a first microactuator coupled to each of the proximal portion and the distal portion and extending across the void;
a second microactuator coupled to each of the proximal portion and the distal portion and extending across the void; and
a flexure electrically connected to each of the first microactuator and the second micro actuator, wherein electrical activation of one or both of the first microactuator and the second microactuator bend the first rail and the second rail to move the distal portion along a X-Y plane relative to the proximal portion, and wherein the first rail and the second rail stiffen the load beam to resist movement between the first portion and the second portion along a Z-axis.

22. A head suspension system comprising:
a load beam comprising:
- a major planar section having a proximal portion and a distal portion;
- a first rail extending along a first lateral edge of the major planar section, the first rail oriented substantially orthogonal to the major planar section of the load beam, the first rail being straight from the proximal portion to the distal portion;
- a second rail extending along a second lateral edge of the major planar section, the first lateral edge opposite the second lateral edge, the second rail oriented substantially orthogonal to the major planar section of the load beam, the second rail being straight from the proximal portion to the distal portion; and
- a continuous void in a metal base of the major planar section, the continuous void extending from the first rail to the second rail to separate the proximal portion from the distal portion; and
- at least one microactuator, each microactuator coupled to each of the proximal portion and the distal portion and extending across the continuous void, wherein electrical activation of the at least one microactuator moves the distal portion relative to the proximal portion.

23. The head suspension of claim 22, wherein the continuous void extends underneath each of the first rail and the second rail.

24. The head suspension of claim 22, wherein the major planar section, the first rail, and the second rail are each formed from a metal sheet, and wherein the metal sheet is bent to define the first rail and the second rail relative to the major planar section.

* * * * *